United States Patent
Svejkovsky et al.

(10) Patent No.: US 8,267,406 B2
(45) Date of Patent: Sep. 18, 2012

(54) RETAINING RING FOR A SEAL RING OF A MECHANICAL SEAL ASSEMBLY

(75) Inventors: Reinhard Svejkovsky, Geretsried (DE);
Wolfgang Ries, Eschenlohe (DE);
Robert Woppowa, Wolfratshausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 330 days.

(21) Appl. No.: 12/227,095

(22) PCT Filed: Mar. 14, 2007

(86) PCT No.: PCT/EP2007/002267
§ 371 (c)(1),
(2), (4) Date: Apr. 6, 2009

(87) PCT Pub. No.: WO2007/137640
PCT Pub. Date: Dec. 6, 2007

(65) Prior Publication Data
US 2010/0270748 A1    Oct. 28, 2010

(30) Foreign Application Priority Data
May 31, 2006  (DE) .................... 20 2006 008 635 U

(51) Int. Cl.
*F16J 15/38*  (2006.01)
*F16J 15/34*  (2006.01)

(52) U.S. Cl. ................ 277/390; 277/396; 277/397

(58) Field of Classification Search ............. 277/390, 277/392, 394, 395, 573, 574, 648
See application file for complete search history.

(56) References Cited

U.S. PATENT DOCUMENTS

| 2,723,868 A | * | 11/1955 | Hartranft | 277/366 |
| 3,213,584 A | * | 10/1965 | Bush | 277/649 |
| 3,639,016 A | * | 2/1972 | Bourgeois | 384/482 |
| 4,415,164 A | * | 11/1983 | Johnson | 277/306 |

(Continued)

FOREIGN PATENT DOCUMENTS

DE    202 02 177 U1    5/2002

(Continued)

OTHER PUBLICATIONS

Written Opening with International Search Report dated Jun. 25, 2007.

(Continued)

*Primary Examiner* — Thomas Beach
*Assistant Examiner* — Nicholas L Foster
(74) *Attorney, Agent, or Firm* — Edwards Wildman Palmer LLP; Scott D. Wofsy

(57) ABSTRACT

A retaining ring for a seal ring of a mechanical seal assembly comprises a recess (8) inserted at the side of one of its axial ends for a sealing receipt and force-fit assembly of the seal ring (2). In the recess (8), an engaging ring (10) made of a flexible material and having a corrugated profile at its inner periphery is retained, wherein at least the elevations (15) of the corrugated profile may be brought in a force-fit engagement with the outer periphery of the seal ring, when the seal ring is moved into the engaging ring by an external mounting force. Each elevation has a leading flange in direction (P) of the mounting movement having a inclination angle α2 larger than α1 of a lagging flange (18).

10 Claims, 1 Drawing Sheet

U.S. PATENT DOCUMENTS

Figure 1:
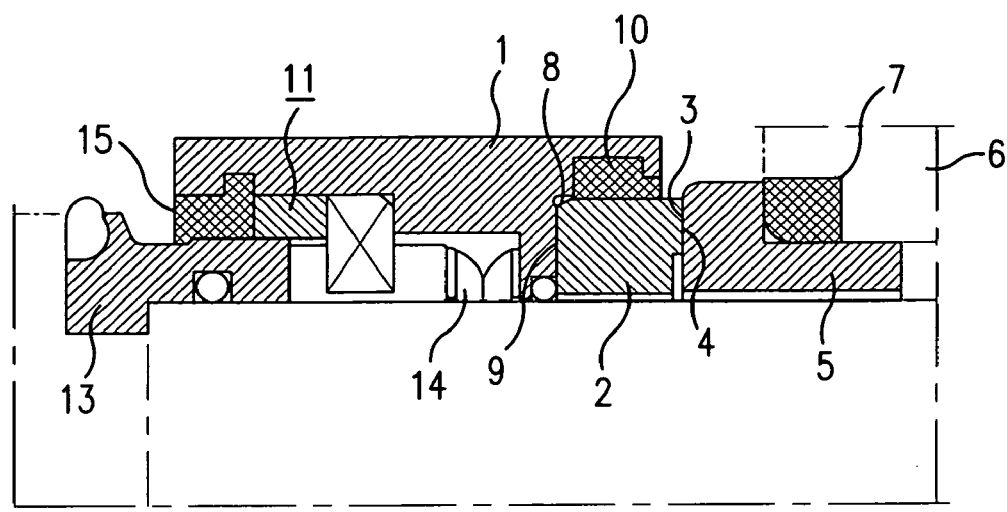

| | | | |
|---|---|---|---|
| 4,429,886 A * | 2/1984 | Buttner | 277/606 |
| 4,842,286 A * | 6/1989 | Heilala | 277/399 |
| 5,020,810 A * | 6/1991 | Jobe | 277/615 |
| 5,332,235 A * | 7/1994 | Fone et al. | 277/380 |
| 6,359,224 B1 * | 3/2002 | Beele | 174/665 |
| 2010/0013166 A1 * | 1/2010 | Svejkovsky et al. | 277/385 |

FOREIGN PATENT DOCUMENTS

| | | |
|---|---|---|
| DE | 101 45 087 A1 | 4/2003 |
| DE | 101 40 837 C1 | 6/2003 |
| DE | 102 16 140 A1 | 11/2003 |
| EP | 0 525 410 A1 | 2/1993 |
| EP | 1336779 * | 1/2003 |
| EP | 1 353 099 A2 | 10/2003 |
| FR | 1 069 590 A | 7/1954 |
| GB | 697134 A | 9/1953 |
| GB | 2 082 269 A | 3/1982 |

OTHER PUBLICATIONS

German Search Resort dated Jan. 23, 2007.

* cited by examiner

RETAINING RING FOR A SEAL RING OF A MECHANICAL SEAL ASSEMBLY

The invention relates to a retaining ring for a seal ring of a mechanical seal assembly.

In particular, the invention relates to an enhancement of mechanical seal assemblies to be used in sterile methods, e.g. medical engineering or food processing. In applications of that kind, often the sealing of fluids having a particularly high degree of purity is concerned, as e.g. ultra-pure water, in which the mechanical seal assembly should not affect the degree of purity. An effective measure in this sense is to avoid deposits at the regions of the mechanical seal assembly exposed to the fluid as far as possible, e.g. the avoidance of dead spots. In the context of mechanical seal assemblies, it is known to mount the rotating seal ring by press-fit, adhesion or soldering in a spring-biased retainer housing, however, these dead spot reducing connecting methods prove to be not practicable in view of the specific materials often used for sterile applications for parts of the mechanical seal assembly, said materials having a very low ferrite content. A force transmission (DE 202 02 177 U) between retainer housing and seal ring by means of engagement pins at the retainer housing engaging into recesses of the seal ring proves to be disadvantageous in some cases of sterile applications, since therewith not only undesirable dead spots are formed, but also no sufficient discharge of heat from the seal ring is secured, and therefore an overheating often occurs. This may result in a failure of the mechanical seal assembly after a short period of time. Due to the low or lacking lubrication effect of ultra-pure water, the thermal stress of the seal rings is high.

It is an object underlying the invention to avoid the mentioned difficulties in the application of mechanical seal assemblies of the aforementioned type. In particular, the invention shall provide a retaining ring for a seal ring, which enables the creation of a mechanical seal assembly being particularly suited to be used in sterile applications, in particular in the presence of low-lubrication to non-lubrication fluids to be sealed.

According to the invention, this object is solved by the features of patent claim 1. Concerning the advantages and specific effects obtained by the invention, reference is made to the following description of an embodiment. The invention solves the aforementioned object efficiently with surprisingly simple means, such that the structure and the mounting of a mechanical seal assembly is simplified. It is known from DE 102 16 140 A to mount a seal ring at a housing by means of a engaging ring made of flexible material, which engaging ring has a corrugated profile at the engaging surface facing the seal ring, however, same has no formation of elevations and recesses corresponding to the features of patent claim 1, such that this arrangement could not obtain the advantageous effects of the invention for the use in sterile applications.

Figure 2:
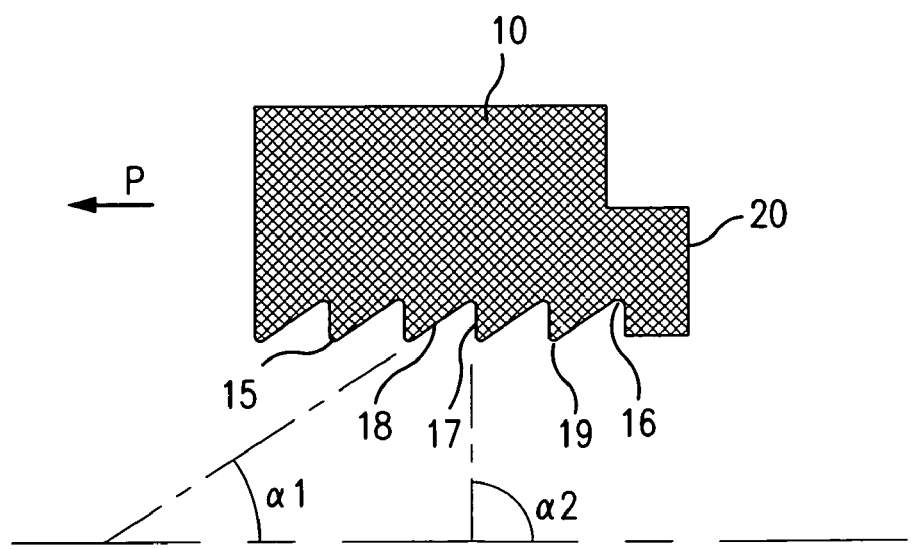

In the following, the invention is explained in detail on the basis of an embodiment and the drawing, in which:

FIG. 1 shows a partial view in longitudinal section of a mechanical seal assembly according to an embodiment of the invention, and FIG. 2 shows an enlarges cross-sectional view of a preferred embodiment of an engaging ring provided in the mechanical seal assembly of FIG. 1.

Although the invention is preferably used in connection with sterile applications, in particular for sealing fluids having a high degree of purity such as ultra-pure water, it is obvious that the invention is not restricted to this field of application, but may basically be used in an advantageous way for mechanical seals.

Reference numeral 1 in FIG. 1 designates a substantially tubular retainer housing 1 which preferably has a smoothly finished or polished outer periphery without any notches or steps, at which deposits could form. A seal ring 2 held at the retainer housing 1 includes a slip or seal surface 3 which co-operates with a like surface 4 of a stationary seal ring 5 in order to seal a portion at the outer periphery of the seal surfaces 3, 4 with respect to a space at the inner periphery. The seal ring 5 is held rotationally fixed at a shaft passage region of a housing 6 of a device to be sealed, e.g. a pump (not shown), wherein a secondary sealing member creates a sealing between the housing 6 and the seal ring 5. Suitable secondary sealing members for sterile applications are known to the skilled person, such that a detailed explanations is not necessary.

At the side of an axial end of the retainer housing 1 (right end in the drawing), a recess 8 is introduced, said recess including a plane radial end face 9 and an outer periphery (no reference numeral) into which a groove for receiving an engaging ring 10 is inserted.

At the side of the other axial end (left end in the drawing), a further recess is provided in order to arrange and mount a rotatory force transmission device which is generally designated by reference numeral 11 and does not need to be described in more detail here. It shall only be pointed out that the rotatory force transmission device 11 serves to connect a mounting ring 13, which may be mounted rotationally fixed on a rotating component 12, e.g. a pump shaft, to the retainer housing 1 such that a rotation of the rotating component 12 or the mounting ring 13 causes a like rotation of the retainer housing 1.

Between the mounting ring 13 and the retainer housing 1, a biasing spring 14, e.g. a corrugated spring, is arranged, which has the effect that the retainer housing 1, which is axially movable with respect to the mounting ring 13, is biased against the stationary seal ring 5 in order to retain the co-operating seal surfaces 3, 4 of the seal rings 2,5 in a sealing engagement with each other. Concerning the detailed structure of corrugated springs, reference is made to BURGMANN, ABC der Gleitringdichtung, 1988, Selbstverlag, page 80. A further secondary sealing member 21 is provided to create a sealing between the mounting ring 13 and the retainer housing 1.

The engaging ring 10 is shown in more detail in FIG. 2. The engaging ring 10 constitutes a compact made of a flexible material, such as an elastomer, and comprises, as shown, a corrugated or saw-toothed profile at its inner periphery facing toward the seal ring 2, said profile consisting of a plurality of axially spaced and circumferentially extending elevations 15 and recesses 16 provided between adjacent elevations.

Each elevation has a leading flange 17 in direction of the arrow P in FIG. 2 and a lagging flange 18, wherein an angle $\alpha 2$ of the leading flange 17 is larger as the angle $\alpha 1$ of the lagging flange 18. The angle $\alpha 1$ may range between 15° and 60°, wherein a value of $\alpha 1$ is preferably 45°. The angle $\alpha 2$ may range between 80° and 110°, wherein a value of 90° is preferred. The angles $\alpha 1$, $\alpha 2$ respectively constitute an opening angle enclosed by a tangent toward the respective flange 17, 18 and a center longitudinal axis of the engaging ring 10, opposite to the direction of the arrow P.

The outer cones 19 of the elevations 15 forming a transition between the lagging and leading flanges are preferably rounded, however, also a transition configured otherwise may be provided. If desired, the flanges 17, 18 may also abut on each other directly.

A lug portion 20 having a smaller outer diameter protrudes from an axial end of the engaging member 10 and extends into an outer entrance bore (not shown) to the recess 8 receiving the engaging ring 10 in the retainer housing 1, as it is shown in FIG. 1. The inner periphery of the lug portion 20 may also have a profile of the aforementioned kind, if desired, or may be formed as a smooth cylinder, as shown in FIG. 2.

The circle circumscribed by the cones 19 of the elevations 15 has a diameter adapted to the diameter of the outer periphery of the seal ring 2 such that the elevations 15 are somewhat deformed or compressed in the radial direction when the seal ring 2 is moved in direction of the arrow P into the engaging ring 10 by a suitable external axial mounting force, such that a force-fit engagement of the engaging ring 10 and the outer periphery of the seal ring 2 occurs. Preferably, the elevations 15 are simultaneously deformed radially and axially, to effect a displacement of material of the elevations 15 into the adjacent recesses 16, such that the recesses 15 are completely or mostly filled in the assembled state and a visible differentiation between recesses 16 and elevations 15 ceases to exist.

The seal ring 6 may be pushed forward in the engaging ring 10 until its radial end face facing away from the sealing surface 3 abuts at the abutting surface 9 of the recess 8 of the retainer housing 1. This abutting relationship is maintained unchanged due to the inventive embodiment of the elevations 15, even if the external mounting forces are removed from the seal ring. The narrow abutting relationship between the adjacent surfaces of the seal ring 9 and the retainer housing 1 enables an effective heat transfer from the seal ring 2 to the retainer housing 1, in order to avoid an overheating of the seal ring 2 during operation. At the same time, the engaging ring 10 enables a safe and simple insertion assembly of the seal ring 2 at the retainer housing 1 and a non-slip transmission of a torque from the retainer housing 1 to the seal ring 2.

The invention claimed is:

1. A mechanical seal assembly for sterile applications comprising a seal ring and a retaining ring, the retaining ring comprising a recess inserted at a side of one of its axial ends for a sealing receipt and force-fit assembly of the seal ring, wherein an engaging ring made of a flexible material and having a corrugated profile at its inner periphery is retained in the recess, the corrugated profile having elevations configured to be brought in a force-fit engagement with an outer periphery of the seal ring when the seal ring is moved into the engaging ring by an external mounting force, wherein each elevation has a leading flange in direction (P) of the mounting movement having an inclination angle ($\alpha 2$) larger than an inclination angle ($\alpha 1$) of a lagging flange, wherein the inclination angle of the leading flange ($\alpha 2$) and the inclination angle of the lagging flange ($\alpha 1$) refer to the opening angle enclosed by a tangent toward the respective flange and the center longitudinal axis, opposite to the mounting movement direction (P), wherein the engaging ring includes a free surface that is flush with a radial surface of the retaining ring for providing a dead-spot-free engagement between the engaging ring and the retaining ring for sterile applications, and wherein the inner periphery of the engaging ring includes the corrugated profile on a first portion thereof and a corrugation-free portion engaged with the outer periphery of the seal ring for providing a dead-spot free engagement between the engaging ring and the seal ring.

2. The mechanical seal assembly of claim 1, wherein the engaging ring is made of an elastomer material.

3. The mechanical seal assembly of claim 1, wherein the inclination angle of the lagging flange ($\alpha 1$) ranges between 15° and 60°, and the inclination angle of the leading flange (a2) ranges between 80° and 110°.

4. The mechanical seal assembly of claim 1, wherein the elevations have rounded cones.

5. The mechanical seal assembly of claim 1, wherein the recess has a radial abutting surface in contact with an end face of the seal ring such that heat transfer can be provided between the surfaces.

6. The mechanical seal assembly of claim 1, wherein the elevations are configured to be deformed toward adjacent recesses by effect of an external mounting force.

7. The mechanical seal assembly of claim 3, wherein the inclination angle of the lagging flange ($\alpha 1$) is 45°.

8. The mechanical seal assembly of claim 3, wherein the inclination angle of the leading flange ($\alpha 2$) is 90°.

9. The mechanical seal assembly of claim 1, wherein the retaining ring is provided at the seal ring, and the seal ring is a rotating seal ring.

10. A mechanical seal assembly for sterile applications comprising a seal ring and a retaining ring, the retaining ring comprising a recess inserted at a side of one of its axial ends for a sealing receipt and force-fit assembly of the seal ring, wherein an engaging ring made of a flexible material and having a corrugated profile at its inner periphery is retained in the recess, the corrugated profile having elevations configured to be brought in a force-fit engagement with an outer periphery of the seal ring when the seal ring is moved into the engaging ring by an external mounting force, wherein each elevation has a leading flange in direction (P) of the mounting movement having an inclination angle ($\alpha 2$) larger than an inclination angle ($\alpha 1$) of a lagging flange, wherein the inclination angle of the leading flange ($\alpha 2$) and the inclination angle of the lagging flange ($\alpha 1$) refer to the opening angle enclosed by a tangent toward the respective flange and the center longitudinal axis, opposite to the mounting movement direction (P), wherein the engaging ring includes a smooth inner cylindrical surface adjacent to the corrugated profile for providing a dead-spot-free engagement between the engaging ring and the seal ring for sterile applications, wherein the inner periphery of the engaging ring includes the corrugated profile on a first portion thereof and the smooth cylindrical surface on a corrugation-free portion thereof.

* * * * *